L. ROSENFELD.
REPAIR PART OR SECTION FOR HEELS.
APPLICATION FILED AUG. 19, 1919.

1,345,886.

Patented July 6, 1920.

Inventor:
Leo Rosenfeld,
by Spear, Middleton, Donaldson & Hall
Attys.

UNITED STATES PATENT OFFICE.

LEO ROSENFELD, OF NEW YORK, N. Y.

REPAIR PART OR SECTION FOR HEELS.

1,345,886.	Specification of Letters Patent.	Patented July 6, 1920.

Application filed August 19, 1919. Serial No. 318,437.

*To all whom it may concern:*

Be it known that I, LEO ROSENFELD, a citizen of the United States, and resident of New York city, have invented certain new and useful Improvements in Repair Parts or Sections for Heels, of which the following is a specification.

My invention is a repair part or section for insertion between the lifts of a heel to level up the bottom lift when this has become worn.

The repair part or section is preferably in the form of a segment 3, thicker at one part 4 than at the other parts according to the worn shape of the bottom lift of the heel.

Figure 1:
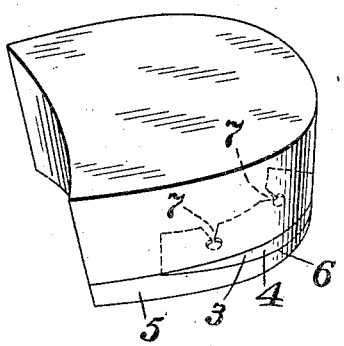
Figure 1 is a perspective view of a heel embodying my invention.
Figure 2:
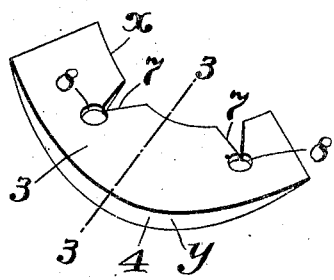
Fig. 2 is a view of the repair part or section.
Figure 3:
Fig. 3 is a sectional view on line 3—3 of Fig. 2.

In Fig. 1 the bottom lift 5 which may be of rubber is worn thin at the point 6 and consequently the heel previous to the application of the repair part or section was uneven and did not present a flat wearing face in one plane.

In order to remedy this the repair man takes the repair part or section 3 and by slightly spreading the lower lift at the worn part from the lift above he inserts the repair part 3 in the crevice thus provided between the lower lift and the one next above it. This repair part or member may be held by the same nails which hold the bottom lift to the heel. These nails need not be removed but the repair part may be provided with V-shaped notches 7 terminating in openings 8 the edges of which embrace the nails, the repair part being sufficiently yielding to permit the nails to be received in the notches and holes.

The repair part or segment is preferably of rubber and it is of taper cross section being thinner at its entering edge $x$ than at its outside edge $y$, and it tapers lengthwise according to the uneven character of the bottom lift it is to repair.

I do not limit myself to the exact construction or any particular shape of the repair part or section.

Rubber bottom lifts are usually provided with holes to receive the nails which secure the lift to the heel and therefore the repair part or section can be formed with the notches and openings to suit this position of the nails.

My invention is particularly adapted for use in connection with heels having its lower lift of rubber because as this is flexible and resilient its normal shape readily can be restored at its lower part by the introduction of the repair part or section, which presses the worn lift down at the point of greatest wear so that its lower face will be flat, the rubber lift at the regions at the sides of the worn spot conforming to the shape or thickness of the repair member.

I do not limit myself, however, to the use of my invention with rubber lifts.

The repair part or section can be applied by a repair man or by the wearer himself.

When the repair part or section is inserted between the lifts the rubber heel will absorb the shock equal to a new heel.

A coat of cement or gum can be put on both sides of the repair part or section.

The repair part or section may be thicker at more points than one in respect to the rest of the section.

The holes in the repair part may be reinforced with metal or rubber. The section or repair part can also be made plain without the openings and notches, or can be made with an opening of other shapes from that shown.

I claim:

As an article of manufacture, a heel repair part adapted for insertion between a worn rubber tread lift and a heel in order to level the worn part, consisting of an elastic rubber wedge, having notches formed in its thinner edge, spaced apart approximately the distance between the nails in the heel with which the part is to be used and arranged to straddle such nails when inserted into the heel.

In testimony whereof I affix my signature.

LEO ROSENFELD.